Figure 1:
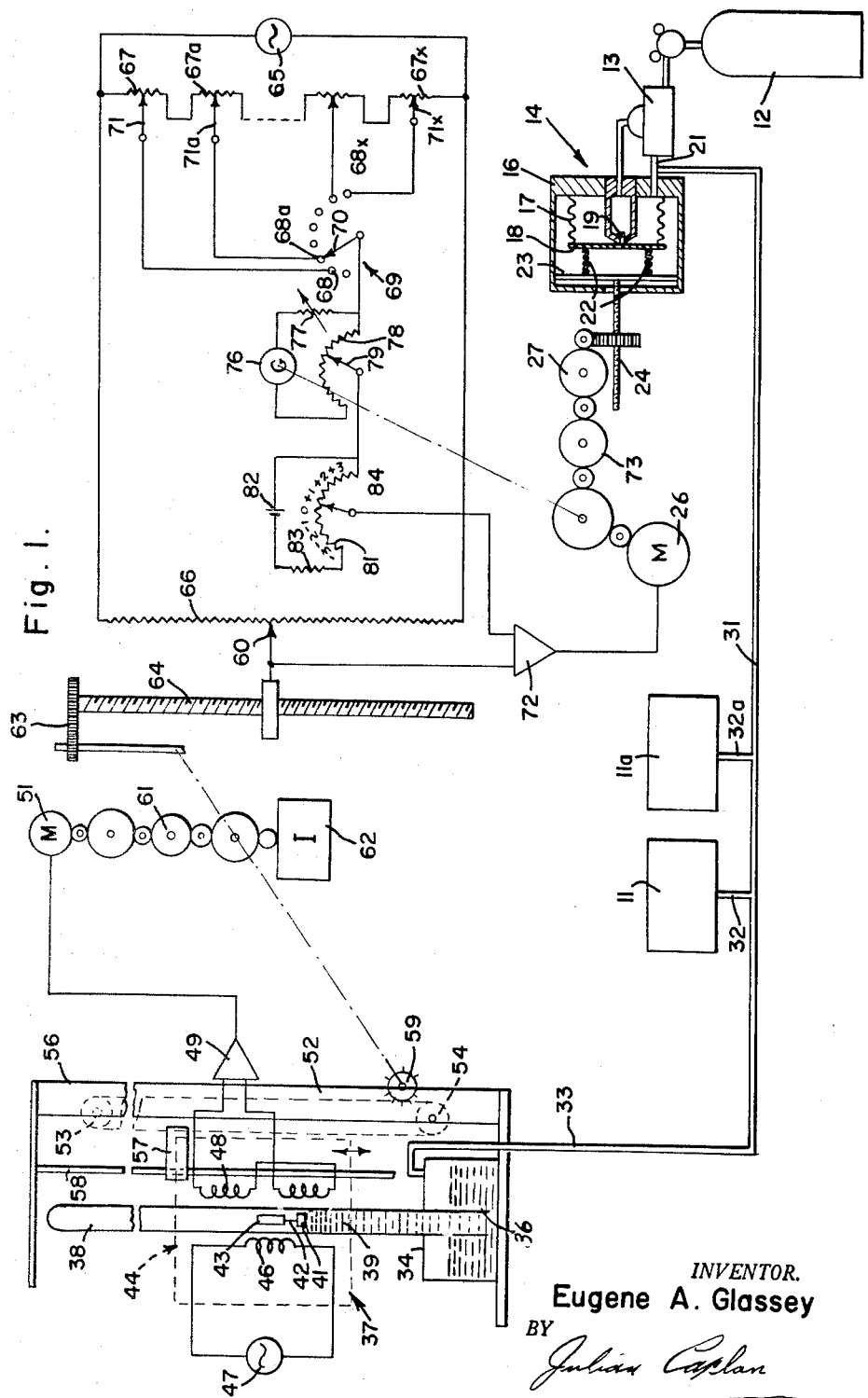

INVENTOR.
Eugene A. Glassey

Feb. 1, 1966  E. A. GLASSEY  3,232,091
SERVO-TYPE PRESSURE REGULATOR
Filed Dec. 14, 1961  2 Sheets-Sheet 2

INVENTOR.
Eugene A. Glassey
BY
Julian Caplan
Attorney

United States Patent Office 3,232,091
Patented Feb. 1, 1966

3,232,091
SERVO-TYPE PRESSURE REGULATOR
Eugene A. Glassey, Los Altos, Calif., assignor to Exactel Instrument Company, Mountain View, Calif.
Filed Dec. 14, 1961, Ser. No. 159,371
14 Claims. (Cl. 73—4)

This invention relates to a new and improved servo-type pressure regulator and, more particularly, to a regulator which may be used to establish, for the purpose of calibrating and testing instruments, a series of predetermined pressures.

One important use of the present invention is in calibrating various pressure sensitive instruments, such as altimeters. Thus, a series of predetermined pressures may be established, which said pressures are indicated and controlled by the reading on a manometer. The instruments under test may then be calibrated by comparison with the reading of the test manometer. Similarly, readings of instruments may be tested by such comparison. Accordingly, the apparatus hereinafter described has for its principal purpose to regulate the pressure preferably at no flow at a series of different pressures which can be rapidly and conveniently reproduced to a very high order of accuracy. The present invention provides a simple, more economical, highly flexible apparatus which is very materially improved in these qualities over other apparatus currently used for similar purposes.

Another feature of the invention is the rapidity with which the pressure points are set up and established.

A still further feature of the invention is the fact that the instrument does not overshoot and come back to the preselected pressure. Overshooting is undesirable in the testing of certain instruments by reason of the effect of such overshooting and retraction on characteristics of the instruments, such as hysteresis of certain pressure sensing instruments, such as altimeters, mach-meters and air data computers.

A still further feature of the invention is the provision of means to add or subtract one or two points or counts to the reading to provide a manual adjustment to compensate for errors which may exist in the setting of the electrical components which determine the pressure points. Thus, the regulator may have a least unit of 0.001 inch of mercury and compensation may be made for plus or minus, one, two or three thousandths, or more, as selected.

A still further feature of the invention is the provision of a means to reduce "hunting." For such purpose, a tachometer-type generator is attached to the servo-motor which regulates the pressure, which generator is in series with a non-linear resistive element. This arrangement damps out the hunting characteristics of the servo-system and materially improves the operation.

It will be understood that there is system inertia and compliance in apparatus of the type of this invention which makes "hunting" a serious problem, much more so than in most servo-systems consisting of purely electrical and mechanical elements. Inertia is represented by the mercury column of a manometer and compliance by reason of compressibility of the gas media within the servo-loop. The use of a tachometer generator and non-linear resistor solves the problem of stabilizing the system.

An additional advantage of the present invention is the high gain or sensitivity made possible thereby which, in turn, makes possible great precision. Sensitivity, zero overshoot, and acceptable servo-performance in a system containing an exceptionally high inertia and elasticity makes conventional techniques for damping hunting unacceptable. The present invention provides an effective, simple, versatile means for accomplishing damping under the conditions stated.

A further advantage of the invention is that the manometer or other pressure sensor indicates actual pressure, independent of error in the regulator, and with an adjustable compensator control as above described. Any error at initial balance may be "zeroed out" or eliminated, leaving an absolutely accurate value of pressure, except for errors inherent in the manometer or other pressure sensor.

A still further feature of the invention is the fact that it may be used to program control pressure values by electrical rather than mechanical elements, thereby improving the flexibility of the apparatus. At the same time, the invention enables the user to program a large number of control points, the number of control points being subject to wide variation depending upon the requirements of the test or calibration.

Still another feature of the invention is the fact that means is provided for continuous dial indication of the true pressure existing.

A still further feature of the invention is the avoidance of the use of any components which pose maintenance or procurement problems.

In a preferred form of the invention, a manometer or other pressure sensor is connected to the instrument under calibration or test to indicate pressure and also to operate one of the adjustable components of a Wheatstone bridge circuit which controls a servo-motor actuating an adjustable pressure regulator supplying pressure to the instrument under test. The other adjustable component of the bridge circuit is selected to provide the desired pressure points.

In a modified form of the invention the manometer or pressure sensor merely indicates pressure. The servo-motor actuating the pressure regulator is controlled by a differential transformer whose armature is selectively positioned at different elevations, the servo-motor also functioning to move the transformer so that its electrical center coincides with the position of the armature.

Other objects of the invention will become apparent upon reading the following specification and referring to the accompanying drawings, in which:

FIG. 1 comprises a schematic view of the electrical, pneumatic and mechanical elements of a preferred form of the invention.

Figure 2:
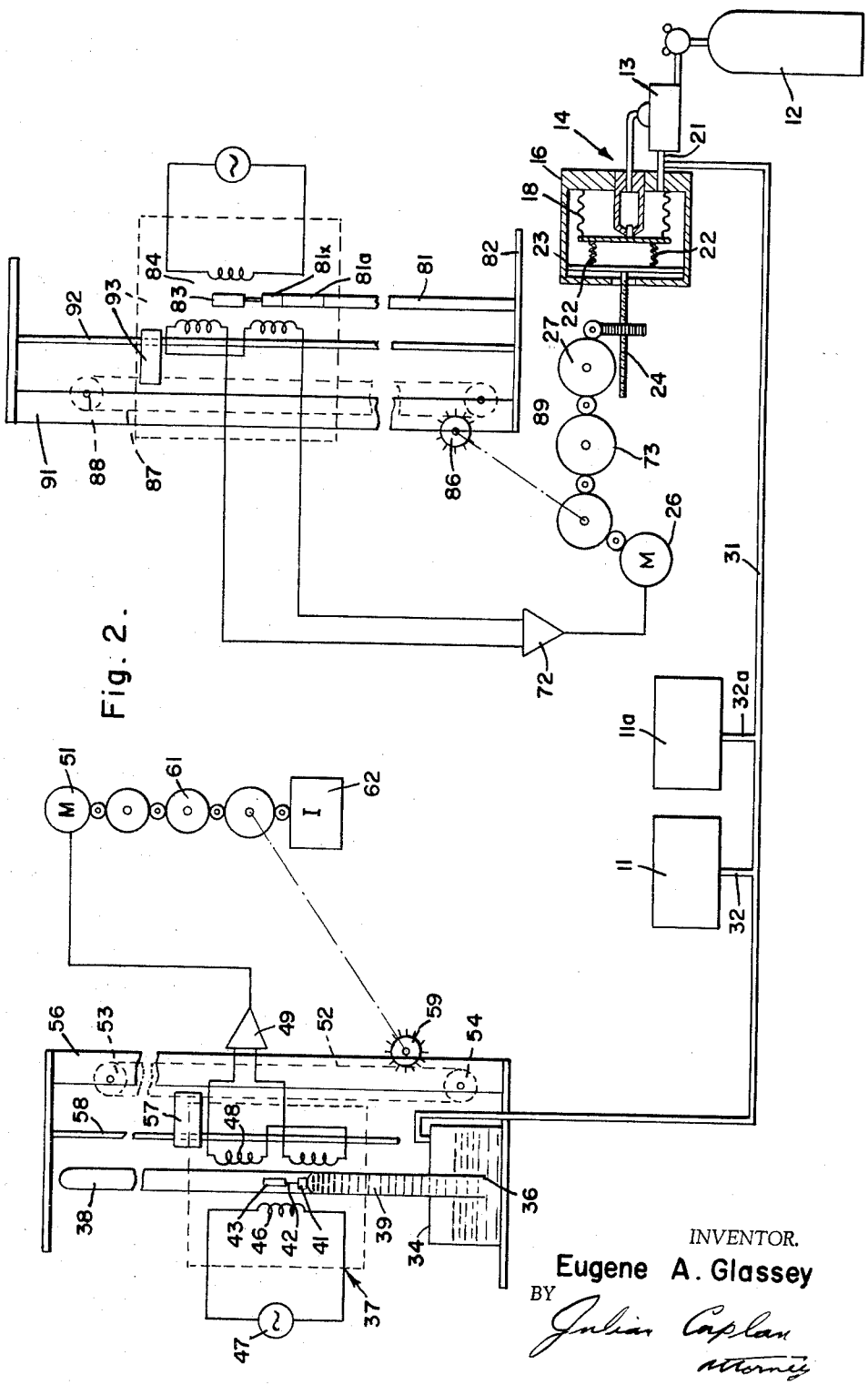

FIG. 2 is a schematic view of a modification.

Essentially, the present invention provides means for testing one or more instruments 11, 11a, or calibrating such instruments which are responsive to pressure over a range of predetermined pressure points. A source of gas, such as nitrogen gas under pressure, is provided in tank 12 which is connected to the input 13 of an extremely accurate pressure regulator 14 of the type shown in U.S. Patents Nos. 2,359,236 and 2,501,957. Complete detailing of the characteristics of pressure regulator 14 is believed unnecessary in that this instrument is well understood in the art and its construction forms no part of the present invention. A casing 16 is provided which receives a diaphragm 17. Diaphragm 17 carries stem valve 18 which moves toward and away from an orifice plate 19 connected to input 13 of the regulator. The output 21 of the regulator is on the opposite side of orifice 19. Thus, as diaphragm 17 is moved toward and away from orifice plate 19, the opening through which the source of pressure passes is controlled to maintain a constant pressure at outlet 21. The diaphragm 17 is biased toward orifice plate 19 by means of spring 22, which in the present case is mounted on a spring mounting plate 23 which is attached to lead screw 24 controled by servo-motor 26. Servo-motor 26 has a pinion 27 which drives lead screw 24. Control of servo-motor 26 is an important feature of the present invention and is hereinafter described in detail. However, it will be noted that as the motor is energized in opposite directions the pressure controlled by regulator 14 is varied.

The output 21 of pressure regulator 14 leads to a manifold 31. Various ports 32, 32a of manifold 31 are connected to one or more instruments 11, 11a under test. Another port of manifold 31 is connected by means of flexible tubing 33 to the cover 34 of cistern 36 of manometer 37. A manometer tube 38 extends up from cistern 36 and is filled with a liquid 39, such as mercury to counter-balance the pressure at the top of cistern 36. On the top of the liquid column 39 is a float 41 which is connected by means of stem 42 to armature 43 received in the core of differential transformer 44. The input coil 46 of transformer 44 is connected to a source 47 of alternating current. The secondary 48 of the differential transformer is fed into a conventional servo-amplifier 49 and the output of amplifier 49 is fed into a conventional second servo-motor 51. Servo-motor 51 is arranged to mechanically move the differential transformer 44 relative to the manometer column 38 so that the transformer 44 is centered relative to armature 43. Various means may be used to move transformer 44. One preferred means uses a perforated metal tape 52 which passes around pulleys 53, 54 at the top and bottom of the support column 56 for tube 38 and has its ends secured to slider 57 which slides on vertical guide 58 adjacent column 56. Transformer 44 is mounted on slider 57. A pinion sprocket 59, having pins fitting into the perforations of tape 52, is driven by motor 51 through gear train 61.

Motor gear train 61 also controls the dials of an indicator 62, which indicator indicates the pressure in the head of cistern 36. It will be noted that the pressure indicated by indicator 62 is likewise the pressure in the instruments 11, 11a under test.

Although the foregoing is an efficient and desirable arrangement, it will be understood that any manometer or pressure sensor which produces an output voltage or shaft position variation may be used. The term "manometer" is used in a general sense to include barometers.

The gear train 61 of second servo-motor 51 (or other sensor) is also connected to the pinion 63 driving lead screw 64 of a high resolution main potentiometer 66, such as a 40-turn helipot. A slider contact 60 is carried by lead screw 64. The output of the main potentiometer 66 is matched in Wheatstone bridge fashion to an alternating or direct current source 65 and to the end terminals of a plurality of individual helipot potentiometers 67, 67a . . . 67x, which are connected to contacts 68, 68a . . . 68x of selector switch 69 controlled by knob 70, so that the windings of potentiometers 67 . . . 67x are connected in electrical series and their sliders 71 . . . 71x brought to the contacts 68 . . . 68x of selector switch 69, which is used to select the control points. The various smaller helipots 67 . . . 67x may be adjusted to pre-select the various pressure points to be used to test the instrument under test or calibration and when adjusted are locked in position. The output of the Wheatstone bridge is fed into servo-amplifier 72 used to drive servo-motor 26. By means of a gear train 73, servo-motor 26 controls the pinion 27 which in turn controls the lead screw 24 of pressure regulator 14. Accordingly, the setting of switch 69 results in motor 26 establishing a pre-selected pressure in manifold 31.

Certain refinements of the foregoing basic Wheatstone bridge circuits are provided. A first adjustment avoids "hunting" of servo-motor 26. For such purpose a tachometer-type generator 76 is mechanically connected to be driven by motor 26. Generator 76 is connected in series with a non-linear resistor 77 across potentiometer 78. Resistor 77 may be of the "Thyrite" type. Hence, as motor 26 "hunts" it produces a voltage in generator 76 which, by reason of the characteristics of resistor 77 tends to damp out the peaks of the source of current of motor 26. The movable contact 79 of potentiometer 78 is used to select the degree of damping required so that the system is neither too sensitive nor too sluggish.

A second adjustment is used when comparison of indicator 62 with the setting desired for any particular point of selector switch 69 shows a slight variation of one or two points. To readjust the setting of one or more particular potentiometers 67 . . . 67x may be undesirable. Accordingly, across potentiometer 81 is placed a small source of current, such as a flashlight battery 82 in series with a fixed ressitance 83. By adjustment of slider 84 of potentiometer 81 the current fed into motor 26 may be adjusted to bring the pressure in manometer 37 and manifold 31 to the desired level. One preferred wiring of the electrical system is illustrated, it being understood that it is subject to considerable variation. Any practical voltage division system may be used in an electrical network producing the same result.

In use, potentiometers 67 . . . 67x are pre-set so that they will give a series of desired pressures depending upon the setting of switch 69. Once set, their slider shafts 71 are locked. The instrument 11 to be tested is connected to manifold 31. Switch 69 is set for the desired first reading. The bridge circuit fed to motor 26 causes the motor to drive regulator 14 until the desired pressure is obtained in manifold 31, such pressure causing adjustment of potentiometer 66 in the bridge circuit as transformer 44 responds to the pressure in manifold 31 (and in cistern 36). The reading on indicator 62 then gives the proper reading on instrument 11. If there is a variation in the desired reading of indicator 62, it may be adjusted by the slider 84 of potentiometer 81. If the system tends to hunt, this may be damped by adjustment of potentiometer 78. The next reading is then obtained by setting of switch 69 and the operation continued until test or calibration is completed.

A modification of the invention is shown in FIG. 2. Many of the components of the modification are substantially the same in structure and function as corresponding components heretofore described and illustrated in FIG. 1; the same reference numerals are used in such instances.

In the form of the invention shown in FIG. 2, servo-motor 51 drives sprocket 59 and indicator 62 but has no other function. Servo-motor 26, which drives regulator 14, is energized by amplifier 72. The input of amplifier 72 is derived in different manner than in FIG. 1. To provide the several pressure points, gauge blocks 81, 81a . . . 81x, such as Johanson blocks, are mounted in a column above base 82. Armature 83 is positioned above the uppermost block and is received in the core of differential transformer 82, the output of which energizes amplifier 72. Servo-motor 26 is used to move transformer 84 so that it is electrically centered relative to armature 83. The means illustrated comprises a sprocket 86 driven by motor 26 and meshing with perforated tape 87 which passes around pulleys 88 and 89 at the top and bottom of second support column 91 on base 82. The ends of tape 87 are fixed to slider 93 which slides along guide 92 (likewise on base 82) which carries transformer 84.

In this modification, the gauge blocks 81, 81a . . . 81x are added to or subtracted from base 82, each increment resulting in a different pressure in the system. Thus, the position of armature 83 determines the position of transformer 84, since it controls motor 26. Motor 26 also varies the pressure in conduit 31 or instruments 11, 11a. Such pressure is also sensed by manometer 38 or equivalent means and read on indicator 62. Hence, the series of gauge blocks can be selected to establish the various desired pressures.

It will be understood that, although not illustrated in the circuit of FIG. 2, damping means to eliminate "hunting" and a compensator for small errors in pressures may be installed in the circuit of the input of amplifier 72 in the same manner as in FIG. 1.

It will be further understood that references for height other than gauge blocks may be employed, examples including verniers, adjustable stops, etc.

Although the foregoing invention has been described in some detail, by way of illustration and example for purposes of clarity of understanding it is understood that certain changes and modifications may be practiced within the spirit of the invention and scope of the appended claims.

What is claimed is:

1. Apparatus for providing proportionate control of regulating pressure at a plurality of pre-selected points comprising a source of fluid under pressure, a pressure regulator connected to said source, first means for adjusting the pressure at the outlet of said regulator, a conduit connected to said regulator, a pressure sensitive instrument connected to said conduit and having indicator means for indicating pressure in said conduit, a servo-motor arranged to actuate said first means, and an electrical circuit arranged to energize said servo-motor, said electrical circuit comprising a source of signal voltage, at least three voltage dividers connected in series across said source, each said voltage divider being individually adjustable in resistance, and when adjusted being fixed in resistance, and switch means having a plurality of contacts corresponding in number to said dividers, and each connected to one of said dividers, said switch means being selectively adjustable relative to said plurality of contacts to connect any desired number of said voltage dividers across said source whereby the voltage from said source may be proportionally adjusted to establish in said conduit a plurality of preselected pressures, said pressures being indicated on said indicator means, said first means being actuated by said servo-motor in an infinite number of graduations of pressure dependent upon the setting of said switch means, the pressure in said conduit being reproducible at any time to correspond to any prior setting of said switch means.

2. Apparatus according to claim 1, in which said circuit includes a generator driven by said servo-motor and a non-linear resistor in series with said generator, whereby hunting of said servo-motor is damped.

3. Apparatus according to claim 1, in which said circuit further comprises a second signal source and adjustment means for adjusting the output of said second signal source, whereby said regulator may be corrected for inaccuracies in said adjustable means.

4. Apparatus for regulating pressure at a plurality of pre-selected points, comprising a source of fluid under pressure, a pressure regulator connected to said source, first means for adjusting the pressure at the outlet of said regulator, a conduit connected to said regulator, a pressure sensitive instrument connected to said conduit, second means responsive to said instrument and having a movable output shaft, the position of said shaft being responsive to said instrument and to the pressure in said conduit, an electrical network comprising a source of signal voltage, third means in said network responsive to the position of said shaft to divide voltage from said source, a plurality of fourth means selectively connected into said network, each said fourth means dividing voltage impressed thereon, a selector switch to select a variable number of said fourth means for connection into said network, a servo-motor responsive to the relative position of said third means and setting of said switch, and fifth means for transmitting movement of said servo-motor to said first means.

5. Apparatus according to claim 4, in which said network further comprises damping means for damping hunting of said servo-motor.

6. Apparatus according to claim 4, in which said network further comprises a generator driven by said servo-motor, and a non-linear resistor in series with said generator, whereby hunting of said servo-motor is damped.

7. Apparatus according to claim 4, in which said network further comprises a second signal source and sixth means for adjusting the output of said second signal source, whereby said regulator may be corrected for inaccuracies in voltage divisions of said fourth means.

8. Apparatus according to claim 4, in which is further provided a plurality of sixth means for adjusting the voltage division of said fourth means.

9. Apparatus for regulating pressure at a plurality of pre-selected points, comprising a source of fluid under pressure, a pressure regulator connected to said source, first means for adjusting the pressure at the outlet of said regulator, a conduit connected to said regulator, a pressure sensitive instrument connected to said conduit, second means responsive to said instrument and having a movable output shaft, the position of said shaft being responsive to said instrument and to the pressure in said conduit, an electrical network comprising a source of signal voltage, a first potentiometer having a first slider responsive to the position of said shaft across said source, a plurality of second potentiometers in series across said source and having second sliders, a selector switch having a movable contact and a plurality of stationary contacts, said stationary contacts being connected to said second sliders of said second potentiometers, a servo-motor driven from said first slider and said movable contact and third means for transmitting movement of said servo-motor to said first means.

10. Apparatus according to claim 9, in which said network further comprises a generator driven from said servo-motor, a non-linear resistor in series with said generator and interposed between said movable contact and said servo-motor, whereby hunting of said servo-motor is damped.

11. Apparatus according to claim 9, in which said network further comprises a second source of current and means for adjusting the output of said second source, whereby said regulator may be corrected for inaccuracies in adjustment of said individual second potentiometers.

12. Apparatus according to claim 9, in which said instrument comprises a manometer having a cistern for liquid connected to said conduit, a tube, an armature movable along said tube with liquid in said tube, a differential transformer outside said tube cooperable with said armature, a second servo-motor, and means driven by said second servo-motor for moving said differential transformer along said tube responsive to position of said armature, said second means being driven by said second servo-motor.

13. Apparatus according to claim 12, which further comprises an indicator driven by said servo-motor to give a reading of pressure in said conduit.

14. Apparatus according to claim 9, in which at least a portion of said conduit comprises a flexible tube.

References Cited by the Examiner

UNITED STATES PATENTS

| | | | |
|---|---|---|---|
| 2,818,726 | 1/1958 | Amonette | 73—4 |
| 2,893,236 | 7/1959 | Coon et al. | 73—4 |
| 3,015,767 | 1/1962 | Taylor | 318—20.426 |
| 3,060,718 | 10/1962 | Malkiel | 73—4 |
| 3,104,540 | 9/1963 | Vitale | 73—4 |

OTHER REFERENCES

Exactel Bulletin 500—1959 edition (page 3 relied on).

ISAAC LISANN, *Primary Examiner.*

MARTIN SCHWADRON, *Examiner.*